Patented Aug. 3, 1926.

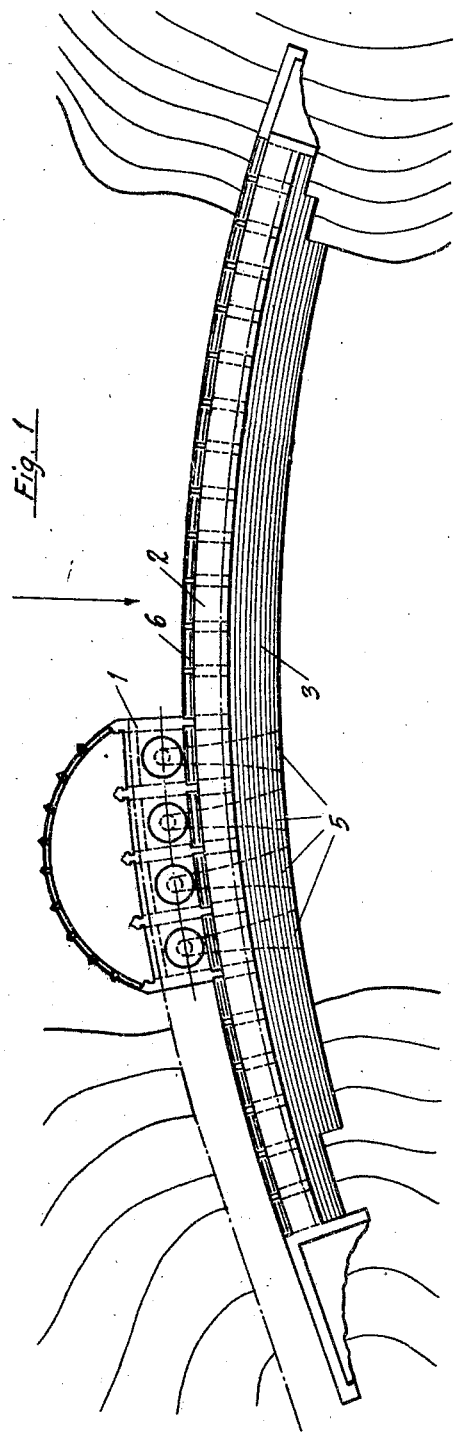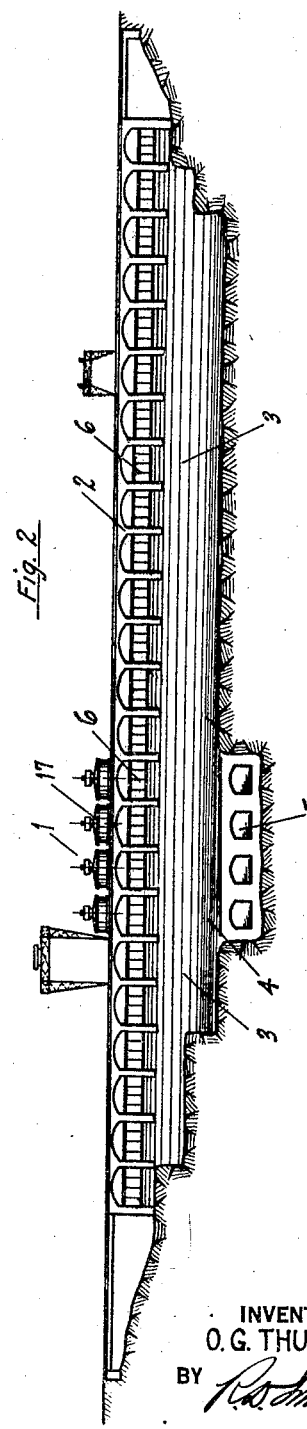

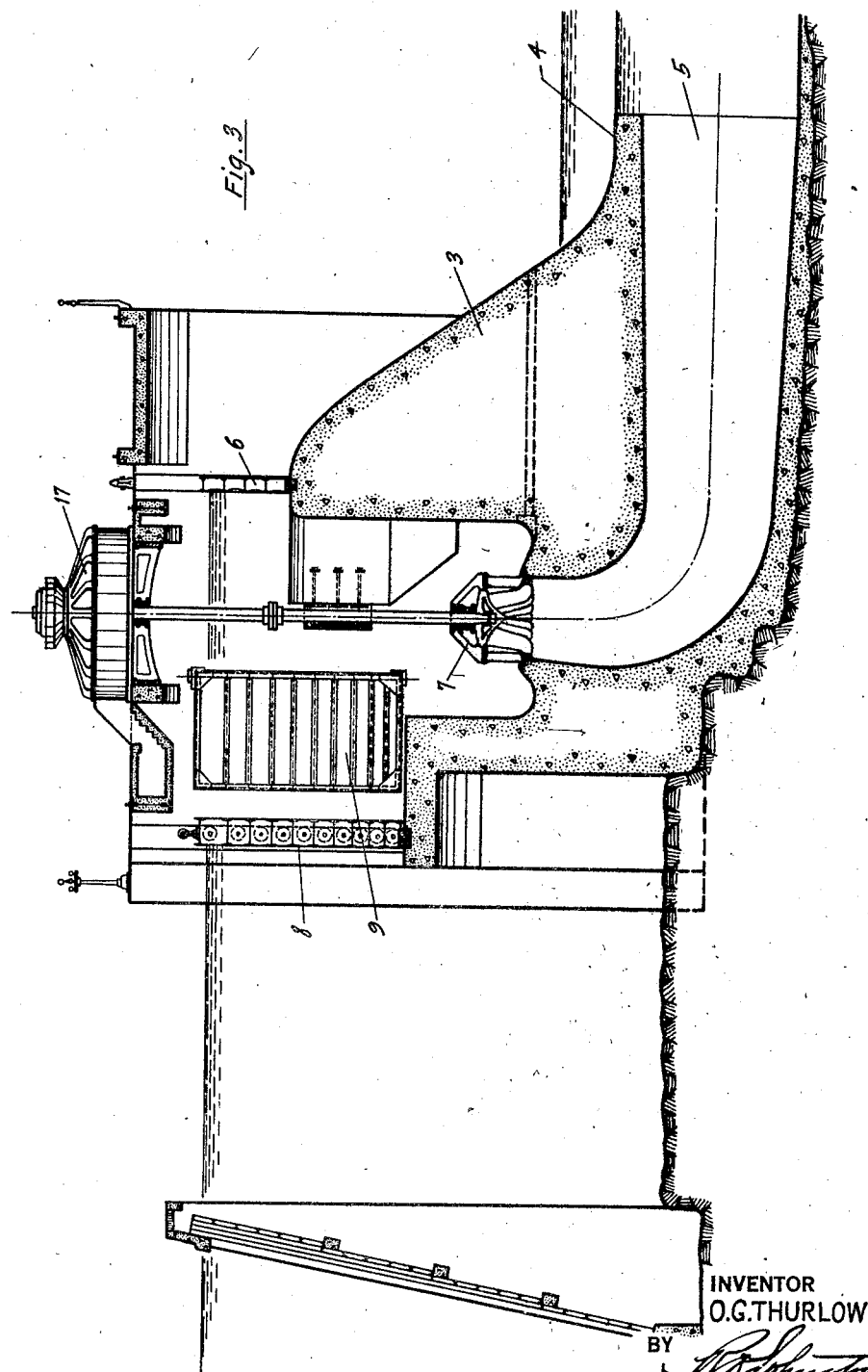

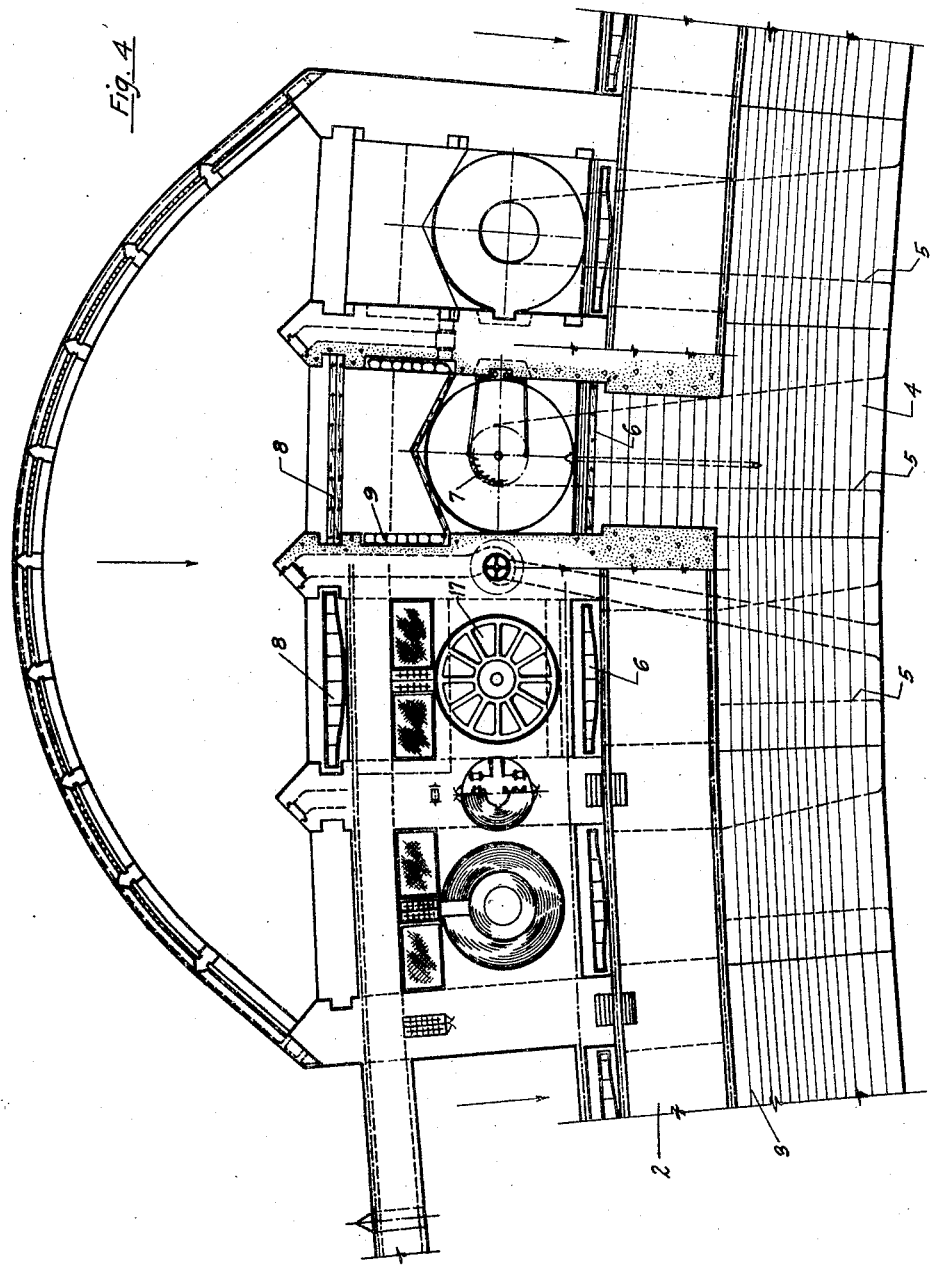

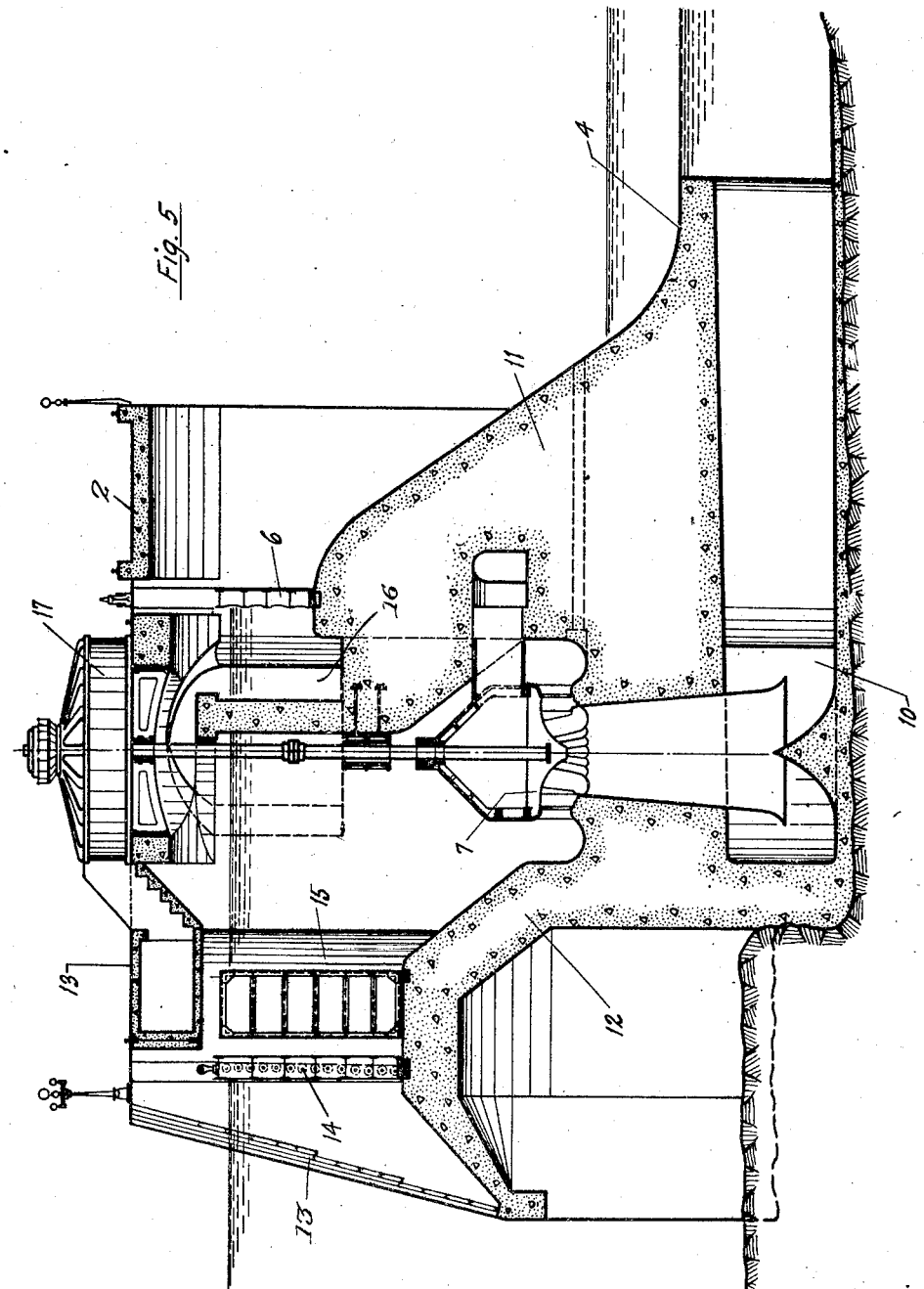

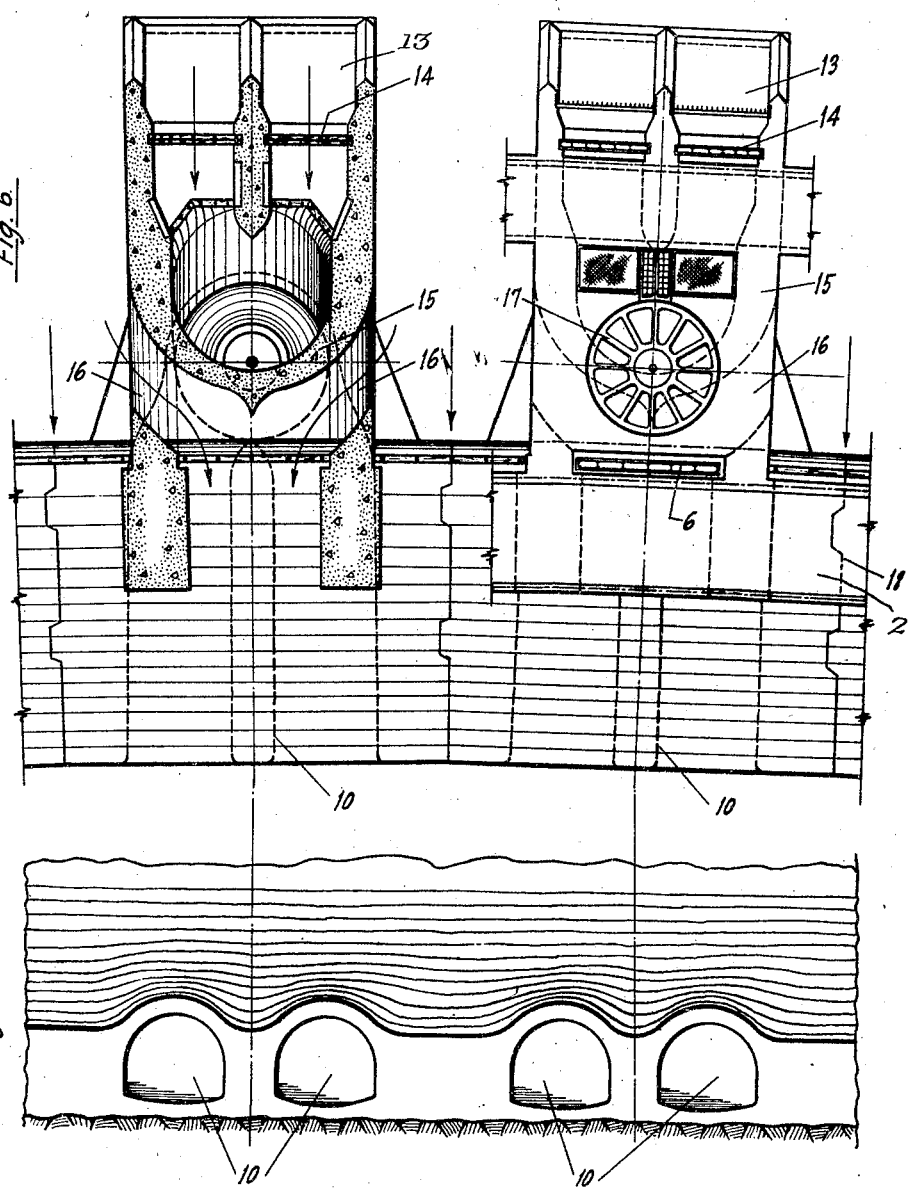

1,594,578

UNITED STATES PATENT OFFICE.

OSCAR G. THURLOW, OF BIRMINGHAM, ALABAMA.

HYDRAULIC POWER PLANT.

Application filed June 14, 1920, Serial No. 388,999. Renewed November 12, 1921. Serial No. 514,829.

My invention relates to hydro-electric power plants and has for its objects to increase the capacity of the turbines under high back water conditions in the tailrace and to reduce the cost of installation by adapting the power house to form a part of the spill way.

In many hydro-electric power plants, now in operation or proposed, there is a great loss of power annually due to the fact that during high water conditions when water is being wasted over the spillway, the level of the water in the tailrace at the outlets of the draft tubes leading from the turbines becomes so high as to reduce the capacity of the turbines and thus reduce the output of the power plant. Notable examples of these conditions are to be found at the hydro-electric plants at Keokuk, McCalls Ferry, Hales Bar and Lock #12 on the Coosa River.

In many cases of proposed developments, engineers have hesitated in recommending the carrying out of the developments on account of the high backwater conditions in the tailrace during the periods of high water. The proposed developments at the Great Falls on the Potomac and Lock 18 on the Coosa are examples.

Water flowing over a masonry dam having a down-stream face of ogee section leaves the apron in a thin sheet at high velocity. At a point below the dam, the location of which is dependent upon many conditions, the water rises turbulently, forming the so-called "standing wave", "back roll" or "hydraulic jump". The thickness of the sheet and the velocity of the water depend upon the height and shape of the down-stream face of the dam, upon the depth at the crest of the dam and upon the depth of the overflow at the crest of the dam. All this is a well known phenomenon of nature. The energy in this overflow sheet has been generally regarded heretofore as solely of a destructive nature and while attempts have been made to improve tailrace conditions by the arrangement of the dam and power house or otherwise, no one to my knowledge, has heretofore conceived the idea as proposed herein, to reduce the level of the water in the tailrace by making effective use of the energy of this spillway water at high velocity and remove the accumulation of backwater from over the draft tube orifices, thereby increasing the effective head on the turbines by the elimination of this negative static back water head.

I propose to pass a portion of the excess flow of the stream through the power plant in such a manner as to cause the overfall to impinge on the back-water in the tailrace and on the water flowing from the draft tubes, so that the level of the water in the tailrace at the outlet of the draft tubes will be lowered thereby below the level which would occur under like conditions of flow in power plants as at present constructed, thereby increasing the effective head on the turbines and increasing their possible power output.

In many developments of the past, the builders have gone to great expense to build power plants parallel to the thread of the stream to avoid having the power plant encroach on the spillway to an undesirable extent.

If the distance between centers of turbines of a hydro-electric plant is to be increased over that normally used in the past, then the number of such cases will tend to increase unless the plant proposed herein is adopted.

The recent adoption of the so-called expanding draft tube or hydraucone type of draft tube in connection with hydraulic turbine installations has led to increase efficiencies, but at the same time the adoption of this type of draft tube often necessitates an increased spacing of units with a consequent increase in the cost of the power plant foundations and will frequently lead to a reduction of the length of the spillway section on account of the encroachment resulting from the increased length of power plant. This increased spacing of turbines is due to the required shape of the draft tube of the above mentioned types. By passing a portion of the excess flow of water through the power house it is adapted in effect to form a part of the spillway and therefore will not in effect reduce the length of the spillway. These results are obtained from the design of the power house foundation, and my invention contemplates passing either through or around the wheel pits the water in excess of that required for power generation.

The arrangement of the concrete and gates may be such as to cause no separation of the water which will flow through the turbine from the water which will flow through the spillway gate openings except that separation which will result naturally, or, the arrangement may be made to separate the water which flows through the spillway gate openings from the water which flows through the turbines, which arrangement will permit the use of so-called expanding draft tubes or hydraucone type of draft tubes without adding excessive cost to the power plant foundation and without causing the power plant to encroach on the spillway capacity to the extent that it would otherwise. My invention further contemplates the provision and control of spillway gates so that, with a limited supply of spillway water, this can be sent over the crest only along that portion above the draft tube openings in use, thereby providing the desired depth of water in the spillway jet or overfall, which, in my design, is more essential than its velocity, as its effective energy for repelling or suppressing the backwater from over the draft tube orifices varies approximately with the one-fourth power of the height of the dam, but with the three-fourths power of the depth of water overflowing the spillway.

My invention further comprises the novel details of construction and arrangements of parts, which in their preferred embodiment only are illustrated in the accompanying drawings which form a part of this specification, and in which:—

Fig. 1 is a plan view; and

Fig. 2 is a rear elevation of a dam and power house designated in accordance with one embodiment of my invention.

Fig. 3 is a transverse vertical sectional view taken centrally through one of the draft tubes.

Fig. 4 is an enlarged plan view of the power house partly broken away to show one of the turbine installations in horizontal cross section.

Fig. 5 is a view corresponding to Fig. 3 of a modified form of my invention in which the hydraucone draft tube is utilized and the water overflowing through the power house is separated from the water flowing to the turbine.

Fig. 6 is a view partly in plan and partly in cross section of the construction shown in Fig. 5.

Fig. 7 shows the outlets of the draft tubes of Fig. 6 in elevation.

Similar reference numerals refer to similar parts throughout the drawings.

As illustrated, 1 is the power house shown disposed on the up stream side of the spillway 2. The down stream side of the power house sub-structure 3 is of ogee section terminating in a horizontal extension forming an apron 4 which lies in a plane but slightly above the upper edges of the turbine draft tubes 5. On the crest of the ogee section 3 I place crest or spillway regulating gates 6 which are arranged and operated so as to control the volume of water required for the jets, and to restrict the overflow of the water under low water conditions to produce the jets above the draft tubes of the turbines in service. The flow of water to the turbines 7 is controlled by gates 8 and 9 of present standard design. As shown in Figs. 1 to 4, the draft tubes are of gradually enlarged cross section which is smallest in the longitudinal central plane of the power house. This design permits the spacing between turbine centers to be reduced to a minimum where economy of space is needed. Where such economy of space is not needed or where it is desired to use a hydraucone or expanding type of draft tube 10, see Figs. 5 and 6, the down stream side of the power house sub-structure 11 will remain substantially the same as the substructure 3 in Fig. 3, but the up-stream side of the power house sub-structure 12 takes the form of separate spaced masonry settings 13, there being one for each turbine 7. Water enters at the up-stream end of the intake or penstock for each setting and is controlled by gates 14, of which one or more may be used. The water, which will flow under control of the spillway regulating gates to the apron 4 to form the high velocity sheet, is separated by the masonry walls 15 from the water flowing to the turbine well, this overflow water preferably passing through the side openings 16 from the opposite sides of the masonry settings 13 and flowing down the ogee spillway under control of the crest or spillway regulating gates 6.

In the design shown in Fig. 6 it will be observed that the up-stream masonry projections 13 form settings for the turbines and their generators 17 and thus, in effect, constitute separate disconnected power plants projecting up-stream from the spillway. They may therefore be spaced on any desired centers and continued across the entire spillway if desired, as each unit is independent structurally of the others. The power plant considered as a whole is thus reduced to its maximum simplicity with a resultant enormous saving in first cost of plant. Moreover, as the settings will have substantially balanced pressure on the turbine pit casings or supply conduits, no steel reinforcement is required to carry the stresses due to bursting pressure of the water in the conduit.

It is of course to be understood that only the spillway above the draft tubes need be designed with the horizontal apron 4, as it is only at this point that the high velocity sheet of water is desired to be used for the local displacement of water from above the draft tube outlets. This local displacement is roughly illustrated by the two water levels indicated in Fig. 5, and it is to be noted that the high velocity sheet of water leaving the apron 4 in such close juxtaposition to the draft tube outlets will further increase the efficiency of the turbines by the ejector action obtained which is effectual to increase the volume of water discharged from the draft tubes. If desired, as shown in Fig. 7, the apron may be curved in cross section to closely follow the contour of the draft tubes.

My invention contemplates the use of settings, whether grouped or spaced, and formed by simple up-stream masonry projections from the spillway as I thus attain the simplest and most effective power plant construction, enabling the engineer to design the plant to best advantage without regard to local conditions, such as have heretofore so seriously interfered with plant design. As thus considered, the draft tubes may be said to pass under the dam spillway which takes the place and is the equivalent of the power house sub-structure 3 or 11, as shown.

I have thus described and illustrated in several forms a practical application of the theory underlying my invention, but without intending to limit myself to the details of construction shown, as I claim broadly the idea of turning to great practical use the surplus water normally wasted over the spillway under high water conditions and of simplifying and improving the design of hydraulic power plants to the end that they shall form parts of the spillway or up-stream projections therefrom.

Having thus described my invention, what I claim, is:

1. In a hydraulic power plant, the combination with a turbine and its supply and discharge conduits, of means utilizing an overflow sheet of water in the form of a substantially horizontal jet not substantially above the low water level to hold the standing wave away from the orifice of the water discharge conduit in the down stream side of the dam.

2. In a hydraulic power plant, the combination with turbines and their water supply conduits and draft tubes, of means to discharge a jet of water at high velocity and in a substantially horizontal plane above and in close juxtaposition to said orifices and in the direction of the water outflow therefrom, and means to concentrate the available overfall water to increase the kinetic energy of said jet.

3. In a hydraulic power plant, a turbine setting having a draft tube, a spillway having its base penetrated by said draft tube and designed to discharge a substantially horizontal sheet of water at high velocity and in a plane above and nearly parallel with the low water surface level above the discharge orifice of said draft tube, and means to concentrate and control the volume of overflow water to create said jet.

4. In a hydraulic power plant, draft tubes, and a spillway penetrated by said draft tubes and terminating in a substantially horizontal apron lying close to the top level of the outflow from the draft tubes, and substantially at the low water level in the tail-race.

5. In a hydraulic power plant, a dam and spillway, turbine settings having draft tubes penetrating said spillway, means at the base of the spillway above the draft tube orifices to utilize the overflow jet to suppress the head of backwater on the draft tubes, and crest gates on the dam and spillway adapted to control and concentrate the overflow over the desired draft tubes.

6. In a hydraulic power plant, a dam and spillway, turbine settings projecting upstream from the spillway and having draft tubes penetrating the base of the spillway and an apron extension substantially at the low water level of the spillway base which extends to the discharge orifices of the draft tubes.

7. In a hydraulic power plant, a dam and spillway, turbine settings having draft tubes penetrating said spillway, a substantially horizontal thin apron extension on the spillway base above its draft tubes adapted to discharge approximately at low water level a substantially horizontal jet over the draft tube orifices, and crest gates to control and concentrate the overflow above the draft tubes.

8. In a hydraulic power plant, a spillway, a turbine setting projecting upstream from the upper face of the spillway which is joined to its sub-structure, said spillway having a down stream face of ogee section which at its base forms a substantially horizontal apron that extends to the draft tube outlets.

9. In a hydraulic power plant, turbines having draft tubes, spaced penstocks which supply water to the turbine, a spillway formed by the power plant sub-structure, and conduits between the penstocks and adapted to deliver overflow water to said power plant spillway.

10. In a hydraulic power plant, turbines having draft tubes, spaced penstocks which supply water for said turbines, a spillway formed by the power plant sub-structure, conduits opening between the turbine penstocks and adapted to deliver overflow water to said power plant spillway, and means utilizing the water overflowing the power plant spillway to artificially lower the water static hydraulic head on the draft tubes.

11. The hereindescribed process for suppressing the backwater head on hydraulic turbine draft tubes, which consists in directing against the backwater substantially at its low water level in the tail-race downstream from the dam a substantially horizontal overfall jet of water having the volume and direction of flow to sweep predetermined heads of backwater down stream from the draft tube orifices.

12. The hereindescribed process for suppressing the backwater head on hydraulic turbine draft tubes, which consists in concentrating the excess flow of water at points opposite the draft tubes, and utilizing said excess of water as overfall jets which impinge substantially horizontally upon the backwater in the tail-race in volume, velocity and direction of flow calculated within the limits of its capacity to drive the standing wave down stream from the draft tube orifices.

In testimony whereof I affix my signature.

OSCAR G. THURLOW.